United States Patent [19]

Shimizu

[11] 3,924,791
[45] Dec. 9, 1975

[54] METHOD OF MAKING A DIAL FOR A WRIST WATCH

[76] Inventor: Noriaki Shimizu, 521 - 5, Imafuku, Ohaza, Kawagoe, Saitama, Japan

[22] Filed: Dec. 27, 1973

[21] Appl. No.: 412,290

Related U.S. Application Data

[62] Division of Ser. No. 326,023, Jan. 23, 1973, Pat. No. 3,803,832.

[30] Foreign Application Priority Data

Feb. 1, 1972  Japan................................ 47-11541

[52] U.S. Cl............. 228/110; 29/243.54; 58/127 B; 228/1
[51] Int. Cl.²......................................... B23K 19/04
[58] Field of Search............. 29/177, 470.1, 243.53, 29/243.54; 228/1; 58/127 B, 127 R

[56] References Cited
UNITED STATES PATENTS

| | | | |
|---|---|---|---|
| 2,604,418 | 7/1952 | Stern............................ | 58/127 R X |
| 3,162,748 | 12/1964 | Vogt.............................. | 29/177 UX |
| 3,206,841 | 9/1965 | Vogt.............................. | 58/127 R X |
| 3,357,620 | 12/1967 | Bratschi................................ | 228/1 |
| 3,451,869 | 6/1969 | Nydegger...................... | 58/127 R X |
| 3,474,619 | 10/1969 | Vogt.................................. | 58/127 R |
| 3,475,628 | 10/1969 | McMaster et al................ | 29/243.54 |
| 3,824,824 | 7/1974 | Leftheris........................... | 29/243.54 |

*Primary Examiner*—Francis S. Husar
*Assistant Examiner*—Gus T. Hampilos

[57] ABSTRACT

A dial for a wrist watch comprises a dial body formed of a flat plate of aluminum and rivet like pin members made of aluminum material and for securing the dial plate body to a time-keeping mechanism. The head portion of each pin member is formed so as to fit into a recess formed on the reverse surface of the body and being integrally fixed to the recess by means of ultrasonic wave welding. Also a method of making the dial for the wrist watch is characterized in that when the head portion of the pin member is joined to the recess, a chip of the ultrasonic wave welding machine is pressure bonded to the head portion to provide the ultrasonic wave vibration so as to integrally join the head portion to the recess.

1 Claim, 13 Drawing Figures

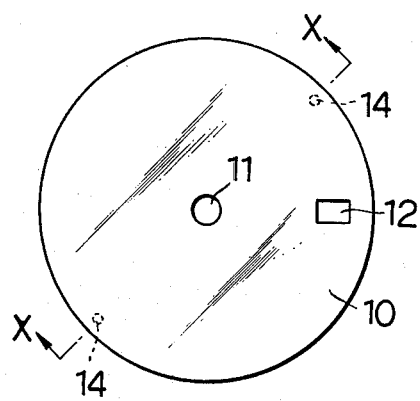
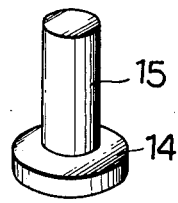
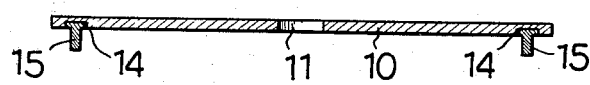
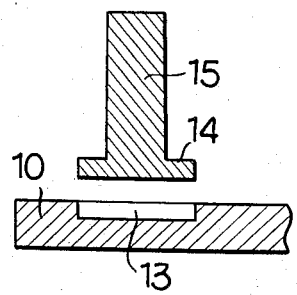
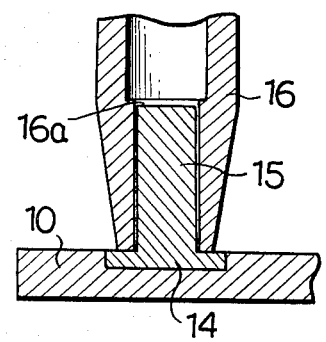
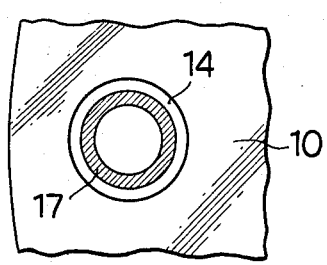
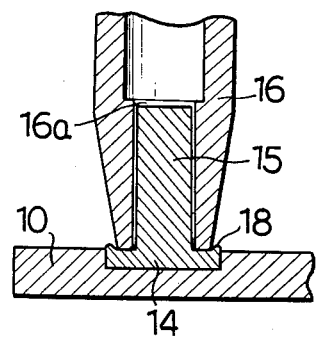

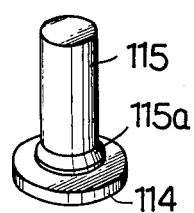
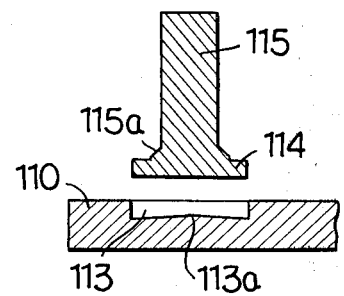
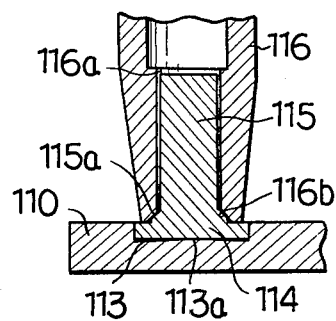
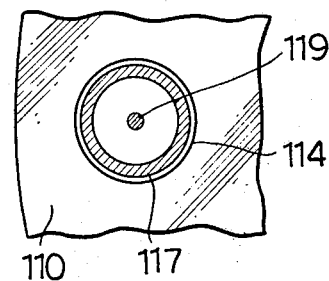
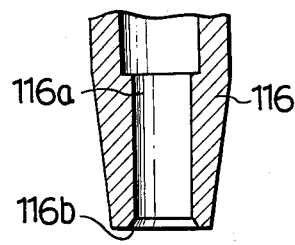
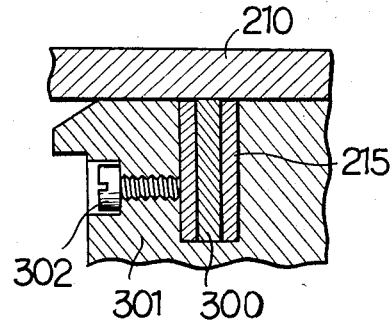

METHOD OF MAKING A DIAL FOR A WRIST WATCH

CROSS-REFERENCE TO RELATED APPLICATION

This application is a divisional of U.S. Patent application Ser. No. 326,023 filed on Jan. 23, 1973 and has matured into U.S. Pat. No. 3,803,832.

SUMMARY OF INVENTION

The present invention relates to a dial structure for a wrist watch and to a method of making the same, and more particularly to a dial that is provided with a pin for securing the dial to a time-keeping mechanism and a method of joining the pin to the dial.

According to the broad concept of the present invention, the dial for the wrist watch comprises a dial body and a pin bonded to its reverse surface. The pin is inserted into a hole formed in the time-keeping mechanism and a set screw is urged against the pin in a right angle direction whereby the dial is fixed on the upper surface of the time-keeping mechanism.

The conventional dial is made of brass and a hollow pin is bonded by means of a soldering means. Thus the pin is soldered on the dial by soldering; for example, silver solder is sealed inside of the hollow pin and this pin is tack welded to the dial by spot welding. Thereafter the silver solder is melted by a burner or furnace, and the joint is formed by the application of the silver solder.

However, according to this type of welding method, there are disadvantages that not only involve the troublesome work of performing tack welding prior to the soldering, and also a substantial high degree technique is required. Further, there is considerable difficulty involved even if the pin is tack welded to the dial body perpendicularly. The pin can easily be bent due to the high temperature heating action of the furnace or burner. When the dial is fixed to the time-keeping mechanism, the bent pin obviously must be straightened. Furthermore, at the time of welding, the silver solder and flux flow as an integral body which leaves a convex mark on the periphery of the welded portion and such a convex mark poses a problem when the dial is fixed to the time-keeping mechanism.

Also, the brass which is the material of the conventional dial has disadvantages such as it is more expensive than aluminum, its weight is heavier and also it has the difficulty of requiring forming work or surface treating and the like. Also, then the dial making involves electroplating with nickel, cyanide is used which is poisonous therefore is potentially harmful to the human body. Also, the residue therefrom may eventually flow to rivers which will become a public hazard.

On the other hand, heretofore the use of aluminum as the material in constructing the dial has been attempted. Even though the welding technique of aluminum is advanced, there is a distinct disadvantage that the strength of the dial will be reduced during such process. The present status of the art is that efforts of making an aluminum dial as a high precision time-keeper part by a practical method has been unsuccessful.

Additional disadvantages of this process are enumerated in the following:

1. when the pin is joined to the dial body by means of soldering, a convex mark is produced on the periphery of the welded portion as mentioned in the foregoing;

2. since the dial body is required to be of a thin wall thickness and its volume is to be small, it structure and material necessarily become annealed by the heating action of soldering which results in a substantial loss of strength, and returning it to its original strength is difficult;

3. although the foregoing disadvantage (2) can be eliminated if aluminum solder that melts at low temperature is used, in such a process alumite is formed and the aluminum solder and flux are not highly resistant to chemicals; also erosion may occur and the joint portion of the pin tends to separate.

When aluminum is used as the material for the dial for the wrist watch, the foregoing disadvantages can be overcome.

Further, many advantages can be obtained with a dial made of aluminum as compared with the conventional dial made of brass. Some examples are: (1) the dial can be made of a light weight; (2) the post or succeeding processing or treatment such as forming, surface coating and printing and the like can be easily performed; (3) desirable designs can be provided; and (4) the dial can be constructed at low cost.

Under the circumstances, as outlined above, the present inventor has confirmed, as a result of energetical studies, a method of making the dial for wrist watch made of aluminum material which method is free completely from the foregoing disadvantages.

The present invention is characterized in that the dial body is formed of aluminum material and a recess is formed at a predetermined position on the body; a rivet like pin member formed of aluminum or similar material; a head portion of the pin member fits into the recess; and the head portion and the recess are joined by the welding energy of an ultrasonic wave.

BRIEF DESCRIPTION OF THE DRAWINGS

FIGS. 2 through 6 and FIGS. 8 through 12 show first and second embodiments, respectively, of the present invention;

FIG. 1 is a top plan view of the dial body;

FIG. 2 is a perspective view of the first embodiment of the pin;

FIG. 3 is an enlarged cross sectional view taken along line X — X of FIG. 1;

FIGS. 4 and 9 are cross sectional views of the dial and the pin before the pin is welded;

FIGS. 5 and 10 are cross sectional views of the condition where the pin is welded to the dial by the chip of the ultrasonic wave welding machine;

FIGS. 6 and 11 are bottom plan views, partially in section, of the dial body and the pin integrally welded together;

FIG. 7 is a cross sectional view showing one adverse example where the pin is welded to the dial body by the chip of the ultrasonic wave welding machine;

FIG. 8 is a perspective view of the second embodiment of the pin;

FIG. 12 is a cross sectional view of the chip used for welding the pin of the second embodiment to the dial plate; and FIG. 13 is a cross sectional view of a structural arrangement wherein the dial is welded by the conventional method to the pin and the dial-pin unit is fixed to the time-keeping mechanism.

PREFERRED EMBODIMENTS OF THE INVENTION

Referring now to the accompanying drawings, two preferred embodiments of the invention will be described in detail with specific reference to FIGS. 2–6 and FIGS. 8–12, respectively.

In FIG. 1, a circular flat dial plate 10 is provided with a circular center hole 11 and a rectangular aperture 12. As shown in FIG. 4, a circular recess 13 is formed in the vicinity of the periphery of the reverse surface of the dial body 10. The recess 13 is formed by measuring a predetermined position on the dial with the use of a jig for accurately positioning and by boring the recess with an endmill or dia. The pin 15 and the dial body 10 are secured to a time-keeping mechanism. The pin 15 formed with a rivet like shape as shown in FIG. 2 is integrally provided with a head portion 14 of a flat circular shape, and is made of aluminum or similar material. The diameter of the head portion 14 is slightly smaller than the diameter of the recess 13, and also its wall thickness is equal to the depth of the recess 13 or is slightly shallower than the depth.

As shown in FIG. 5, in order to weld the pin 15 to the dial body 10, after fitting the head portion 14 to the recess 13, a hollow portion 16a of the chip 16 of the ultrasonic wave welding machine is inserted to operatively contact the pin 15. The tip portion of the chip 16 is operatively urged against the head portion 14 by the ultrasonic wave oscillation being applied thereto. When the oscillation is applied, the recess 13 and the head portion 14 are thereby welded integrally by the welding energy of the ultrasonic wave.

Since the pin 15 that is welded to the dial body 10 is employed for securing the dial to the time-keeping mechanism, it is required to have a high tensile strength and bending strength.

According to end results of an experiment conducted by the present inventor, a thickness of the head portion 14 was made 0.18 mm, its diameter was 0.9 mm and a diameter of the pin 15 was 0.65 mm; the pressure of the chip 16 for the head portion 14 was 5 kg, and its pressure contact time was 0.25 sec.; the current of the ultrasonic wave welding machine was 2.5A, and the ultrasonic wave welding machine whose oscillating frequency was $19.5 \pm KH_2$ was used; the pin 15 whose recess 13 was welded to the head portion 14 could withstand the tensile strength of 6 kg and also could withstand the bending strength (angle of 20°) of 15 times in the right and left directions or forward and backward directions; and such tensile strength and the bending strength having such values substantially surpass greatly the tensile strength and bending strength ordinarily required for welding of the pin to the dial plate body.

In the present invention, the salient features are that, as mentioned in the foregoing, the recess 13 being provided in the dial plate body 10, the head portion 14 of the pin 15 being fitted and ultrasonically welded into the recess 13 whereby the joint surface of both elements can be made larger and thus stronger. Also, with the foregoing arrangement, when the above-mentioned joining is made, there are advantages in that the erection of the pin 15 on the surface of the dial body 10 and the application of the pressure of the chip 16 to the pin 15 becomes extremely easy.

FIG. 6 illustrates the joining structure of the recess 13 and the head portion 14. It can be recognized that a welded portion 17 is formed in ring shape and the reason for such form is that the tip portion of the chip 16 is formed in ring shape and is thusly made to correspond to the portion that it is to be urged against. The pressure contacting portion produces a strong abrading action as compared with the other portion. In order to join not only the ring-like welding portion 17 but also the other portion, it may be considered that the pressure of the chip 16 against the head portion 14 can be made greater and its pressure contacting time can be prolonged. However, the pressure and the pressure contacting time should not exceed certain maximum values. As shown in FIG. 7, in such a situation, there is a possible adverse effect in that a bulged portion 18 can be formed on the periphery of the head portion 14. The bulged portion 18 becomes an obstacle in the case where the dial plate body 10 is fixed to the time-keeping mechanism. Also, the convex mark whose shape is similar to the head portion 14 can be produced on the surface of the dial plate body 10, or the concave portion 13 is broken and the finish of the surface of the dial plate 10 becomes deteriorated.

As shown in FIG. 8, the pin 115 is provided with an enlarged diameter tapered neck portion 115a at the joint of the stem portion and the head portion 114. This enlarged neck portion does not become a problem when the dial body 110 is fixed to the time-keeping mechanism. The neck portion 115a plays a role of preventing the shearing off of the pin 115 from the stem portion of the pin 115 from the head portion 114 when the force of a fixed tensile and/or bending strength is applied to the pin 115. Namely, when the pin 115 is being welded to the dial body 10 the stem portion of the pin 15 may be sheared off from the head portion 14 when an excess tensile and/or the bending force is applied to the pin 15. However, with the pin 115 being provided with an enlarged neck portion 115a at its stem portion, there is a substantial increase in the tensile strength and bending strength as compared with the arrangement where the pin is not provided with the enlarged neck portion 115a.

Also, as shown in FIGS. 9 and 10, the dial body 110 is provided with a different shaped surface in the recess, according to the second embodiment. A recess 113 is provided with a surface 113a whose center or medial section is elevated and is tapered from the medial section to the periphery of the recess. The surface 113a produces an abrading action that is necessary for its joining to the center surface of the head portion 114. Therefore when the required tensile and/or bending force is applied to the pin 115, it plays a role of preventing the shearing off of the head portion 114 from the concave portion 113. Namely, as described previously, the head portion 14 for the recess 13 may be sheared off from the recess 13 when an excess tensile and/or bending force is applied to the pin as the ring like portion 17 alone is being integrally welded thereto. When the recess 113 is provided with the surface 113a, the necessary abrading action is produced on recess 113 and the center surface of the head portion 114 when the tip portion of the chip 116 is pressure contacted with the head portion 114. Therefore, as shown in FIG. 11, in addition to a welded portion 117, the welded portion 119 is formed on the center surface. As a result, the tensile and/or bending strength for the pin 115 becomes remarkable improved as compared with a recess that has not been provided with the projecting surface 113a.

In the present invention, the head portion 114 of the pin 115 being provided with an enlarged neck portion 115a can be welded to the recess 13. Also, the head portion of the pin 15 can be welded to the recess 113 that is provided with the surface 113a. Therefore, various structural arrangements of the elements can be effected.

As shown in FIGS. 10 and 12, the chip 116 has a structure which is substantially identical with that of the chip 16, with the exception that a tapered expanded portion 116b is provided at the tip of the hole whose shape is adapted to engage with the enlarged neck portion 115a.

In FIG. 13, the conventional dial 210 is provided with a pin 215. The pin 215 is made with a hollow shape, and inside thereof is sealed with silver solder 300. The pin 215 is welded to the dial 210 by means of the silver solder 300, the disadvantage of which has already been explained. The dial 210 having been mounted in contact with pin 215, as shown in FIG. 13, is then inserted into a time-keeping mechanism 301. A set screw 302 is pressure contacted with the pin 215 at right angles from the lateral direction whereby the pin is fixed to the time-keeping mechanism 301.

It is to be noted in the present invention that the dial bodies 10 and 110 may be made of an alloy whose principal component is aluminum which alloy can be welded by ultrasonic welding. Also, instead of providing the tapered surface 113a on the recess 113, a portion whose shape is similar to the tapered surface 113a may be provided on the center surface of the head portion 113. Also, the present invention is not to be limited to the numerical values described in the foregoing description.

What is claimed is:

1. A method of making a dial structure for a wrist watch comprising in combination the following steps:
    a. making a circular-shaped dial body formed of a flat plate of aluminum and having front and rear surfaces,
    b. forming a plurality of circular recesses on the rear surface of said dial body adjacent the periphery thereof,
    c. forming each of said recesses so that the bottom surface continuously tapers from an elevated medial section to the periphery thereof,
    d. providing a plurality of circular rivet like pin members wherein each of said pin members is formed of an aluminum material and has elongated stem and flat head portions, each stem portion being integrally joined to its respective flat head portion and adapted to engage with a time keeping mechanism, each of said stem portions having an enlarged neck portion at the joint of said stem portion and said flat head portion,
    e. positioning said flat head portion of each of said pin members in a perpendicular manner with said elevated medial section of each of said inner surfaces of said recesses, respectively, of said dial body, and
    f. ultrasonically welding to integrally join said flat head portions with said elevated medial sections, respectively, to form a circumferential weld portion and a central weld portion.

* * * * *